United States Patent
Myokan

(10) Patent No.: US 8,331,764 B2
(45) Date of Patent: Dec. 11, 2012

(54) RECORDING/REPRODUCING APPARATUS AND METHOD OF RECONSTRUCTING TIME CODE

(75) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 12/323,746

(22) Filed: Nov. 26, 2008

(65) Prior Publication Data

US 2009/0142032 A1 Jun. 4, 2009

(30) Foreign Application Priority Data

Nov. 30, 2007 (JP) .............................. P2007-311182

(51) Int. Cl.
*H04N 9/80* (2006.01)
(52) U.S. Cl. .... 386/248; 386/328; 386/356; 386/E5.003
(58) Field of Classification Search .................. 386/248, 386/328, 356, E5.003
See application file for complete search history.

(56) References Cited

U.S. PATENT DOCUMENTS

2004/0011869 A1* 1/2004 Yamada ........................ 235/435

FOREIGN PATENT DOCUMENTS

| JP | 9 180414 | 7/1997 |
|----|----------|--------|
| JP | 10 93904 | 4/1998 |
| JP | 10-106239 | 4/1998 |
| JP | 2006-66986 | 3/2006 |

* cited by examiner

*Primary Examiner* — Thai Tran
*Assistant Examiner* — Girumsew Wendmagegn
(74) *Attorney, Agent, or Firm* — Frommer Lawrence & Haug LLP; William S. Frommer

(57) ABSTRACT

A recording/reproducing apparatus includes a synchronization signal generating part outputting a frame synchronization signal defining a period of a video frame; a timer part measuring a time during a period where a main power supply is being turned off; a time code production part generating a time code based on the frame synchronization signal; a time code storage processing part storing a time code value and time information output from the timer part, when main power supply is turned off; and a time code reconstruction processing part reconstructing the time code, when the main power supply is turned on, by stepping the time code value by an amount corresponding to a period where the main power supply is being turned off based on the time code value and the time information stored and time information at the time of turning on the main power supply.

9 Claims, 7 Drawing Sheets

RECORDING/REPRODUCING APPARATUS AND METHOD OF RECONSTRUCTING TIME CODE

CROSS-REFERENCES TO RELATED APPLICATIONS

The present invention contains subject matter related to Japanese Patent Application JP 2007-311182 filed in the Japanese Patent Office on Nov. 30, 2007 and the entire contents of which being incorporated herein by reference.

BACKGROUND OF THE INVENTION

1. Field of the Invention

The present invention relates to a recording/reproducing apparatus and a method of reconstructing a time code, specifically a recording/reproducing apparatus having a "FREE RUN" mode where a time code is stepped while a main power supply is being off and a method of reconstructing a time code.

2. Description of the Related Art

When editing a video signal and creating video contents, the video signal from a video camera, an image recording device, or the like is input into an editing apparatus, where the "in" point and "out" point of each input video signal are specified based on a time code. In particular, in the case where one video content is prepared with video signals obtained by a plurality of video cameras or the like, positions of the respective video signals are determined on the time axis based on a time code. Thus, input video signals from different systems may need to be provided with time codes synchronized with each other.

In such a case, recording is carried out in a "FREE RUN" mode where video cameras or the like may have the same start value for the respective time codes and time code values are stepped in real time. Thus, time codes for the video signals of different systems input in an editing apparatus can be synchronized with each other.

Therefore, since a time code may need to be synchronized with real time when recording is carried out in the "FREE RUN" mode, the time code value is stepped without interruption while a main power supply of the video camera or the like is in OFF state. In other words, electric power may need to be supplied without interruption to a time code generator for generating a time code. FIG. 1 illustrates an example configuration of a time code generator according to the related art.

As shown in FIG. 1, a dedicated power supply unit (battery) 300 is connected to a time code generator 100 so that the power-supply unit 300 can supply electric power to the time code generator 100 in the state where there is no power supplied from a main power supply. In the state where the main power supply is turned on, the time code generator 100 operates with electric power supplied from the main power supply. Thus, with electric power being supplied, the time code generator 100 carries out the stepping of a time code value on the basis of the frame synchronization signal input from a video sync generator 200.

Japanese Unexamined Patent Application Publication No. 10-093904 discloses a video camera capable of continuously supplying electric power to a time code generator even when a main power supply is turned off.

SUMMARY OF THE INVENTION

As described above, electric power may need to be continuously supplied from a battery to a time code generator to allow the time code generator to continue stepping while a main power supply is being turned off. Therefore, power consumption may be increased. In addition, a time code generator that can receive electric power supply from a battery may need to be exclusively provided, causing an increase in manufacturing cost.

It is desirable to generate a time code in real time without a dedicated time code generator.

According to an embodiment of the present invention, there is provided a recording/reproducing apparatus including: a synchronization signal generating part, a timer part, a time code production part, a time code storage processing part, and a time code reconstruction processing part. The synchronization signal generating part is configured to output at a predetermined interval a frame synchronization signal that defines a frame period of video. The timer part is configured to measure a time during a period in which a main power supply is being turned off. The time code production part is configured to generate a time code on the basis of a frame synchronization signal. The time code storage processing part is configured to store a time code value and time information output from the timer part when the main power supply is turned off. Further, when the main power supply is turned on, the time code is reconstructed on the basis of the time code value and time information stored by the time code storage processing part and time information at the time of turning on the main power supply. The time code is reconstructed by stepping a time code value stored by the time code storage processing part by the amount corresponding to a period where the supply of main electric power is being stopped.

Therefore, even when the supply of main electric power is stopped, upon turning on the main power supply, the same time code value as one generated in a state where the main power supply is continuously in ON state is obtained, securing the continuity of a time code under main power off.

According to an embodiment of the present invention, even when main power supply is stopped, upon returning the main power supply to an ON state, the same time code as one generated under the conditions in which a time code is generated while the main power supply is continuously in ON state can be obtained. Therefore, it becomes possible to generate the time code in real time without including a time code generator for exclusive use.

DESCRIPTION OF THE PREFERRED EMBODIMENTS

Hereinafter, an embodiment of the present invention will be described with reference to FIGS. 2 to 7.

Figure 1:
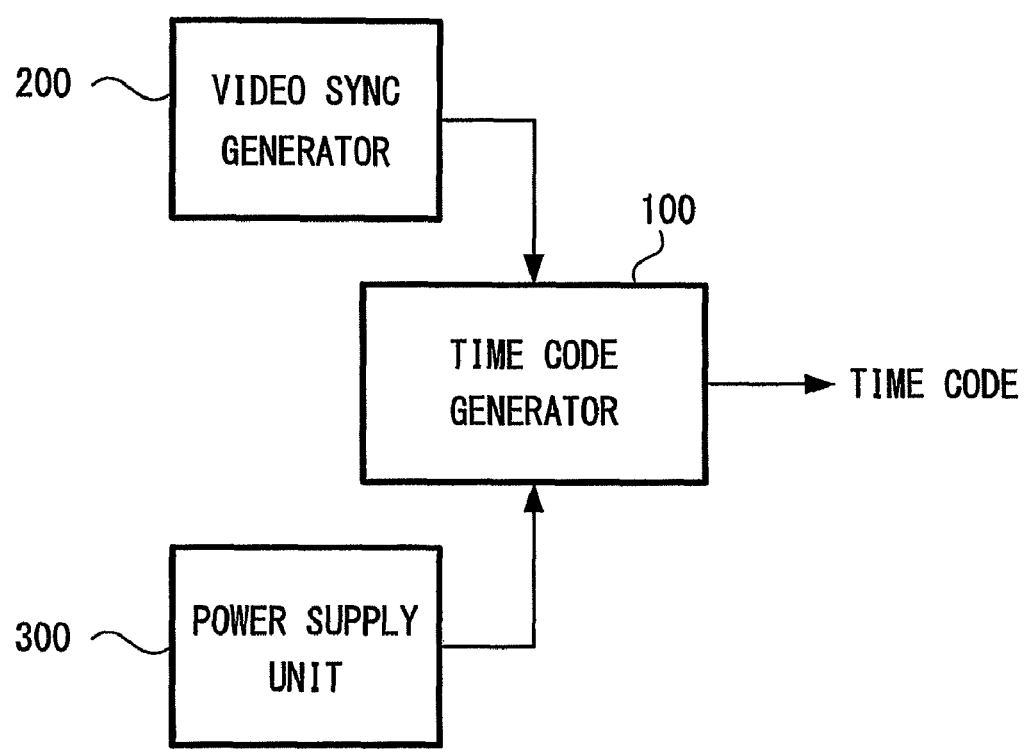
FIG. 1 is a schematic diagram illustrating a configuration of a time code generator of the related art.
Figure 2:
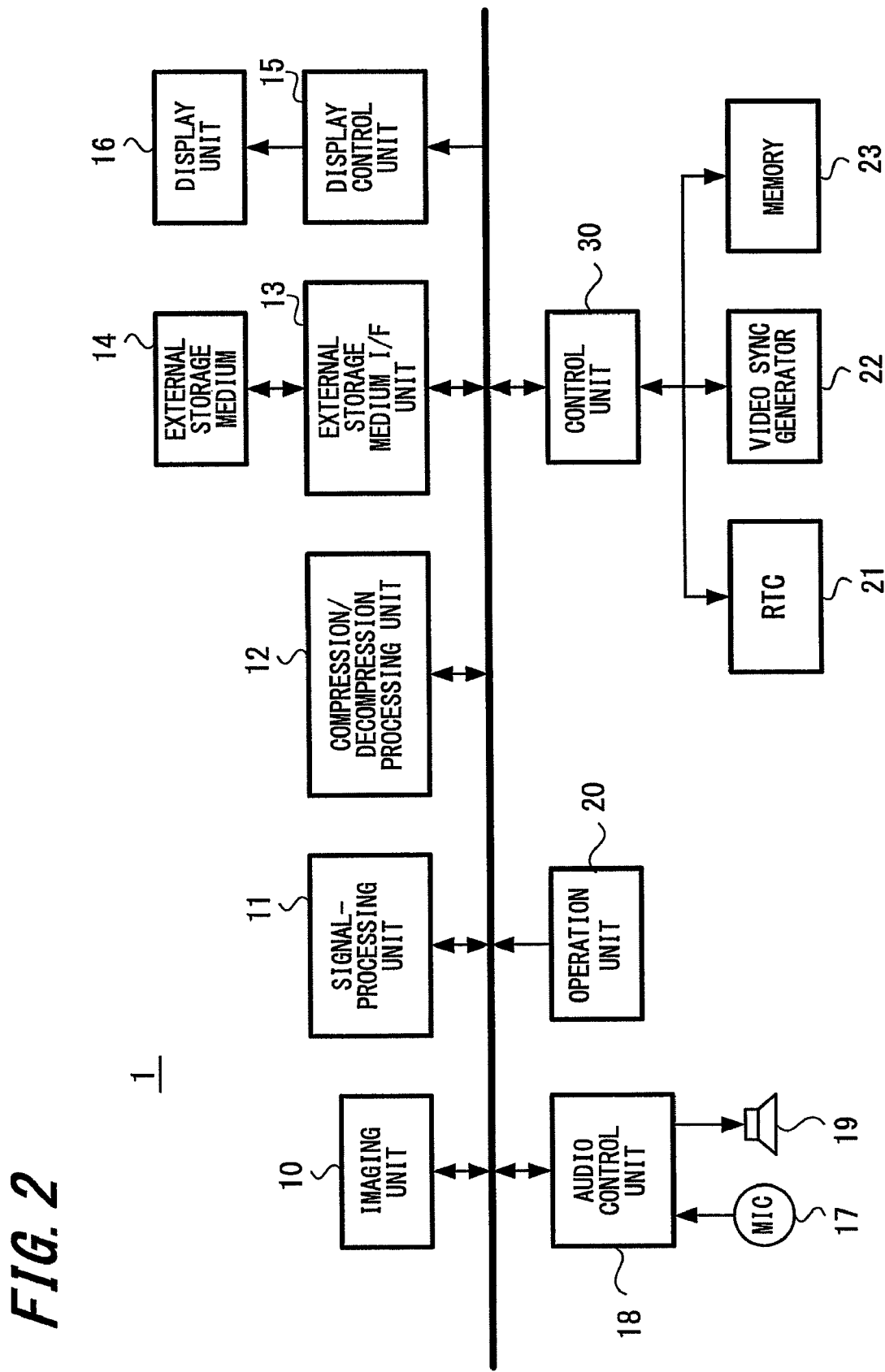
FIG. 2 is a block diagram illustrating a configuration of a recording/reproducing apparatus according to an embodiment of the present invention.

FIG. 2 is a block diagram illustrating an example of the internal configuration of a recording/reproducing apparatus 1. The recording/reproducing apparatus 1 shown in FIG. 1 includes an imaging unit 10, a signal-processing unit 11, a compression/decompression processing unit 12, an external storage medium interface (I/F) unit 13, an external storage medium 14, a display control unit 15, a display unit 16, a microphone 17, an audio control unit 18, a speaker 19, an operation unit 20, a real-time clock (RTC) 21, a video sync generator 22, a memory 23, and a control unit 30.

The imaging unit 10 carries out photoelectric conversion of incident light from a subject through a lens (not shown) and then outputs a resulting video signal. In addition, the imaging unit 10 includes an analog-to-digital (A/D) convertor (not shown) for converting an analog video signal into a digital video signal. The signal-processing unit 11 performs digital signal processing on the digital video signal output from the A/D convertor. Specifically, the signal-processing unit 11 performs a knee correction of compressing a video signal at a certain luminance level or more, a gamma ($\gamma$) correction of correcting the level of a video signal according to a predetermined gamma curve, and white clip processing or black clip processing of limiting the level of a video signal within a predetermined range.

The compression/decompression processing unit 12 compresses the video signal processed at the signal-processing unit 11 according to the standard of, for example, MPEG (Moving Picture Experts group) 2. The data compressed by the compression/decompression processing unit 12 is transferred to the external storage medium 14 via the external storage medium I/F unit 13 and then stored in the external storage medium 14. Furthermore, the compression/decompression processing unit 12 also performs decompression of compressed video data stored in the external storage medium 14. Subsequently, the video data-decompressed by the compression/decompression processing unit 12 is output to the display unit 16 via the display control unit 15.

The display control unit 15 controls the display unit 16 to display images and characters of time code or the like thereon. The display unit 16 may be a liquid crystal display (LCD) or the like and display images and characters under the control of the display control unit 15.

The microphone 17 picks up and converts an external sound into an audio signal and then outputs the audio signal to the audio control unit 18. The audio control unit 18 performs compression of the audio signal output from the microphone 17 by a given audio compression technology such as MPEG1 and decompression of the compressed audio signal read out from the external storage medium 14, followed by outputting the resulting signal to the speaker 19. Subsequently, the speaker 19 outputs as a sound the audio signal output from the audio control unit 18.

The operation unit 20 may include buttons, knobs, switches, or the like (not shown) with which the user inputs an operation. Subsequently, the operation unit 20 transmits a control signal to the control unit 30 in response to the input of operation. The control unit 30 may include a micro processing unit (MPU) or the like to control each of the units or parts of the recording/reproducing apparatus 1. In addition, the control unit 30 is also responsible for storing present-time information and time code information when the main power supply is turned off and for reconstructing a time code and the like when the main power supply is again turned on. The details of storing the present-time information and the time code information and reconstructing the time code will be described later on.

The control unit 30 is connected to the RTC 21, the video sync generator 22, and the memory 23. The RTC 21 counts the present time supplied to the control unit 30. The term "present time information" (hereinafter, also referred to as real-time information) refers to one represented as a 32-bit integer by an elapsed time (the number of seconds) from the Greenwich Mean Time (GMT), for example, from 0:00 on Jan. 1, 1970. The RTC 21 is connected to a power supply unit (not shown), such as buttery, different from one (not shown) connected to the recording/reproducing apparatus 1. Thus, the RTC 21 can be supplied with power from the power supply unit even if the main power supply of the recording/reproducing apparatus 1 is in OFF state and continuously supply present time information to the control unit 30. Here, the main power supply of the recording/reproducing apparatus 1 is one where the supply of electric power is switched on/off by operating the power switch of the apparatus 1. The RTC 21 may be one of general-purpose products commercially available in the art.

The video sync generator 22 generates a frame synchronization signal (vertical synchronization signal) and then outputs the generated signal to the control unit 30. The frame synchronization signal is a signal for specifying the interval of updating a video frame displayed on the display unit 16. The memory 23 includes a nonvolatile memory, such as a flash memory, and stores a program used for the operation of the recording/reproducing apparatus 1, various values to set, and so on. In addition, the memory 23 also stores data generated during the processing carried out by the control unit 30, real-time information and time code information when the main power supply is turned off, and so on.

Figure 3:
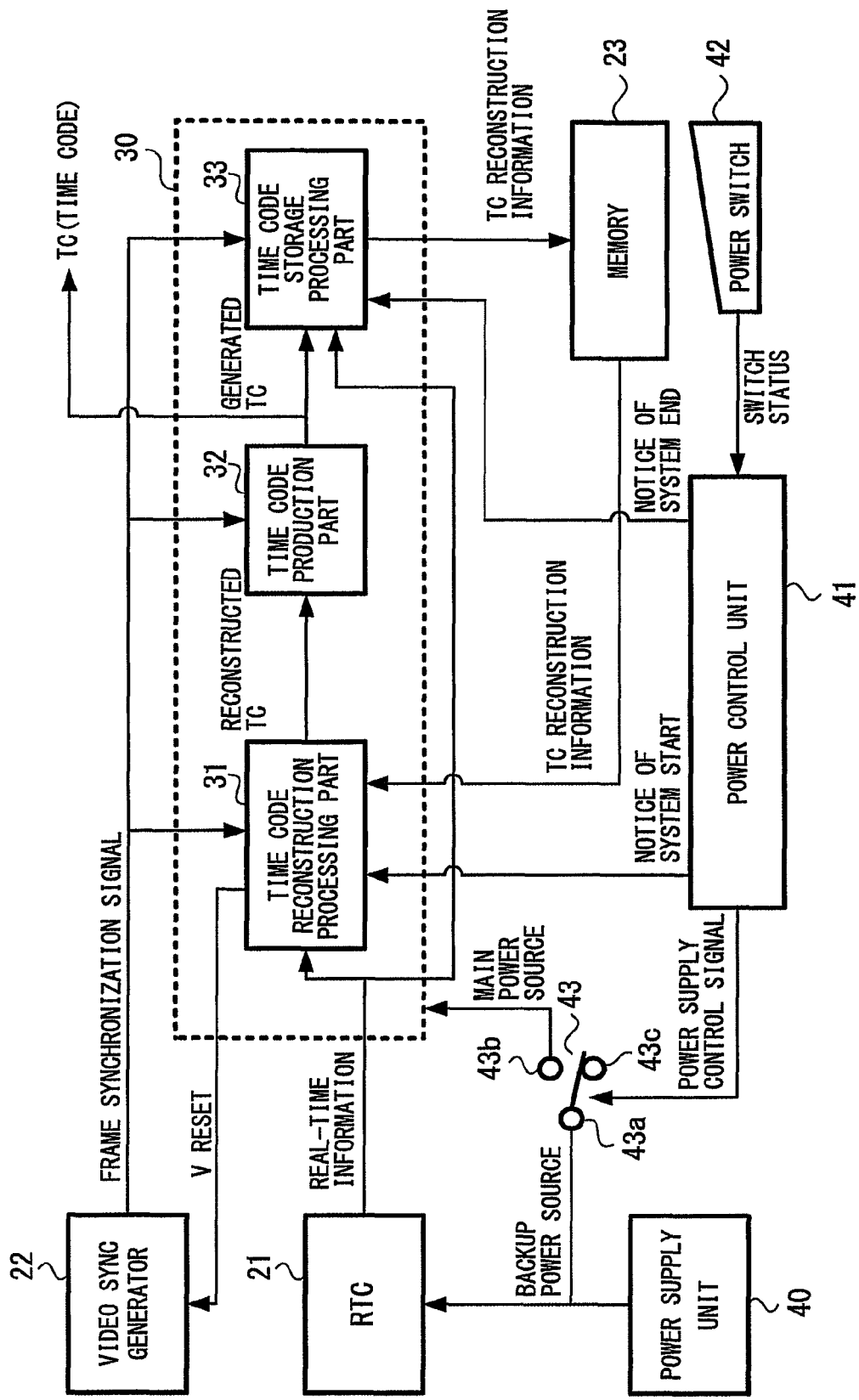
FIG. 3 is a block diagram illustrating a configuration of a control part in the recording/reproducing apparatus according to an embodiment of the present invention.

Referring to a block diagram shown in FIG. 3, the configuration of the control unit 30 will be described in detail. As shown in FIG. 3, part of the configuration surrounded by the dashed line represents the control unit 30. As shown in FIG. 3, the same structural elements as those in FIG. 2 are designated by the same reference numerals. The control unit 30 includes a time code reconstruction processing part 31, a time code production part 32, and a time code storage processing part 33. The details of processing carried out in the respective parts will be described later.

The control unit 30 is connected to the RTC 21, the video sync generator 22, the memory 23, and a power control unit 41. The video sync generator 22 generates a frame synchronization signal and then outputs the generated signal to each of the time code reconstruction processing part 31, the time code production part 32, and the time code storage processing part 33.

The RTC 21 outputs real-time information to both the time code reconstruction processing part 31 and the time code storage processing part 33. In addition, the RTC 21 is connected to a power supply unit 40 that supplies power to the RTC 21 even if the main power supply is being turned off. As shown in FIG. 3, furthermore, the RTC 21 is designed to be supplied with power from the power supply unit 40 provided as a battery of the recording/reproducing apparatus 1. Alternatively, the RTC 21 may be provided with a dedicated power supply unit and supplied with power from the dedicated power supply unit.

The power control unit 41 is connected to a power switch 42 for receiving from the user an instruction of switching on/off the main power supply of the recording/reproducing apparatus 1. The switching operation of the user on the power switch 42 allows the power control unit 41 to start or terminate power supply from the main power supply.

When the main power supply is turned on to start the supply of electric power, the power control unit 41 outputs a signal for notifying the time code reconstruction processing part 31 of system start-up (notice of system start-up) after turning the main power supply on. In addition, when the main power supply is turned off from ON state, the power control unit 41 outputs a signal for notifying the time code reconstruction processing part 31 of system end (notice of system end), followed by turning the main power supply off. These notifications act as triggers for starting a time code storage sequence and a time code reconstruction sequence as described later. Furthermore, the power control unit 41 generates a power-supply control signal for selecting a source of power supply to the control unit 30 and then outputs the resulting power-supply control signal to a switch 43.

The switch 43 includes electric contacts 43$a$, 43$b$, and 43$c$. The contact 43$a$ is connected to the power supply unit 40. The contact 43$b$ is connected to the control unit 30. In contrast, the contact 43$c$ is not connected to any member. Therefore, the switch 43 is configured such that a state in which the contacts 43$a$ and 43$b$ are connected and a state in which the contacts 43$a$ and 43$c$ are connected are switched over as the contact 43$a$ as a fulcrum in response to the content of a power-supply control signal supplied from the power control unit 41.

In the state where the contacts 43$a$ and 43$b$ are connected to each other, the electric power is supplied from the power supply unit 40 to both the RTC 21 and the control unit 30. In the case where the contacts 43$a$ and 43$c$ are connected to each other, the electric power is supplied from the power supply unit 40 only to the RTC 21. In the state where the electric power is supplied from the power supply unit 40 only to the RTC 21, the control unit 30 receives the power supply from the main power supply.

In other words, in the case where the user inputs the instruction of turning on the main power supply using a power switch 42, the contacts 43$a$ and 43$c$ of the switch 43 are connected to each other in response to a power-supply control signal generated at the power control unit 41. Thus, the electric power is supplied from the power supply unit 40 only to the RTC 21. In this state, electric power is supplied from the main power supply to the control unit 30.

In the case where the user inputs the instruction of turning off the main power supply using the power switch 42, the contacts 43$a$ and 43$b$ of the switch 43 are connected to each other in response to a power-supply control signal generated at the power-control unit 41. The electric power is supplied from the power supply unit 40 to both the RTC 21 and the control unit 30.

The time code production part 32 generates a time code signal and then superimposes the generated time code signal on a video signal. The time code signal contains time data (time code values) including hour, minute, second, frame and ID information for a time code stepping method, such as "drop frame" or "non-drop frame", or the like. Furthermore, the stepping of time code values are performed on the basis of a frame synchronization signal output from the video sync generator 22. There are "FREE RUN" and "REC RUN" modes used for the operation of stepping time code values.

One of these can be selected as a mode to carry out the stepping depending on the operation input by the user to the operation unit 20 (see FIG. 2) or the like. The selected contents may be stored in the memory 23 or the like as a set value.

As is already described with the related art, a time code value synchronized with a real time is generated in the "FREE RUN" mode. On the contrary, a time code value is stepped only during recording (REC) operation in the "REC RUN" mode. A time code value is generated synchronizing with a video signal when the "REC RUN" mode is selected. In other words, since the recording operation is not performed while the main power supply is being off, the stepping of time code values is not performed either.

In the case where a time code value is input from the time code reconstruction processing part 31, the time code production part 32 performs the processing of stepping time code in response to the input time code value. A time code value generated at the time code production part 32 is output to the display unit 16 via the display control unit 15 (see FIG. 2) and also to the time code storage processing part 33.

A time code storage sequence is started when the time code storage processing part 33 receives notice of system end issued from the power control unit 41. The term "time code storage sequence" means a series of processing of storing in memory 23 time code information and real-time information (RTC information) at the time of receiving notice of system end. Here, the time code information includes information about the time code stepping method, such as a "drop frame" or "non-drop frame" in addition to a time code value. The details of the time code storage sequence carried out by the time code storage processing part 33 will be described later with reference to FIGS. 4 and 5.

Upon receiving a notice of system start from the power control unit 41, the time code reconstruction processing part 31 starts a time code reconstruction sequence. The term "time code reconstruction sequence" means a series of processing of reconstructing a time code value by reading from the memory 23 the time code information and real-time information stored at the system end. The time code reconstructed by the time code reconstruction processing part 31 is output to the time code production part 32. The details of the time code reconstruction sequence will be described with reference to FIGS. 4, 6, and 7.

Figure 4:
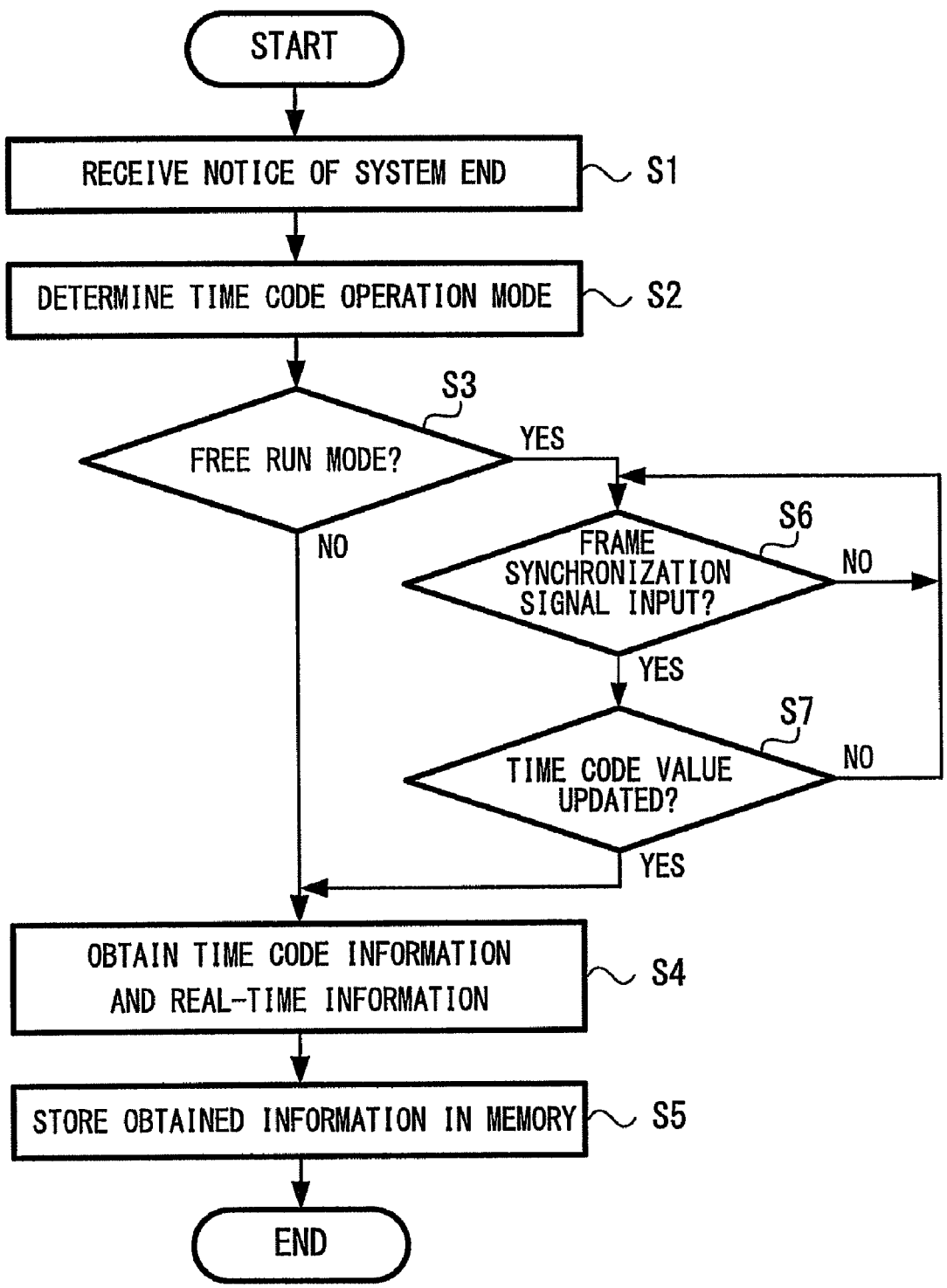
FIG. 4 is a flowchart illustrating an example of processing carried out by a time code storage processing part in a recording/reproducing apparatus according to an embodiment of the present invention.

Referring to the flowchart represented in FIG. 4 and the diagram represented in FIG. 5, the time code storage sequence carried out by the time code storage processing part 33 will be described. As shown in FIG. 4, first, when the time code storage processing part 33 receives notice of system end issued from the power control unit 41 (Step S1), then the time code storage processing part 33 determines the time code operation mode (Step S2). In other words, the time code storage processing part 33 determines whether the time code operation mode is "FREE RUN" mode or "REC RUN" mode.

Then, it is determined whether the time code operation mode is "FREE RUN" mode (Step S3). If it is not in "FREE RUN" mode but in "REC RUN" mode, then time code information and real-time information are obtained (Step S4). The time code information thus obtained is linked with the real-time information and then stored in the memory 23 (Step S5).

If it is determined in Step S3 that the time code operation mode is "FREE RUN" mode, then whether a frame synchronization signal is input from the video sync generator 22 is determined (Step S6). If there is no input, then the processing of Step S6 is repeated. If the frame synchronization signal has been input, then it is determined whether a time code value is updated in synchronization with the input frame synchronization signal (Step S7).

If it is determined that the time code value is not updated, then the processing of Step S7 is repeated. On the other hand, if it is determined that the time code value is updated, then time code information and real-time information are obtained (Step S4). The time code information thus obtained is linked with the real-time information and then stored in the memory 23 (Step S5).

Figure 5:
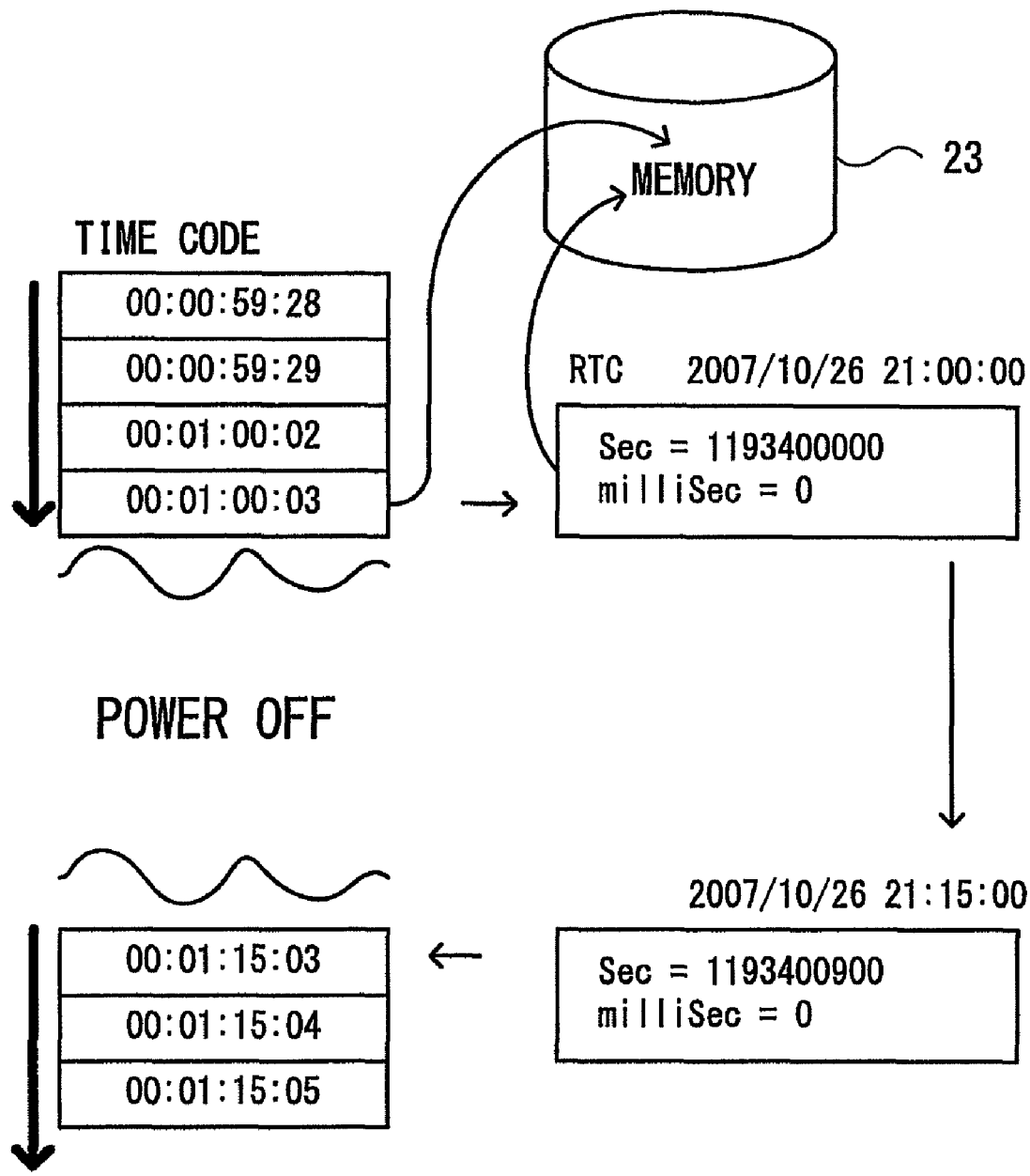
FIG. 5 is a schematic diagram illustrating an example of processing of storing and reconstructing a time code in a recording/reproducing apparatus according to an embodiment of the present invention.

FIG. 5 is a schematic diagram illustrating the processing of storing and reconstructing time code values when the "FREE RUN" mode is selected. The left side of FIG. 5 represents stepping of time code values such as "00:00:59:28", "00:00:59:29", and so on. For example, if the main power supply is turned off when the time code value is "00:01:00:02", the memory 23 stores the next updated time code value "00:01:00:03" in Step S4 as shown in FIG. 4. Subsequently, the time code storage processing part 33 (see FIG. 3) stores the real-time information at that time in addition to the time code value "00:01:00:03".

If the present time (real time) at that time is assumed to be 21 (hours):00 (minutes):00 (seconds) on Oct. 26, 2007, then a value representing the time in terms of 32-bit integer numbers is linked with the time code value and then stored in the memory 23. As shown in FIG. 5, among pieces of the present time information ticked by the RTC 21, a value smaller than a second is represented as, for example, "Sec=1193400000 milliSec=0".

Figure 6:
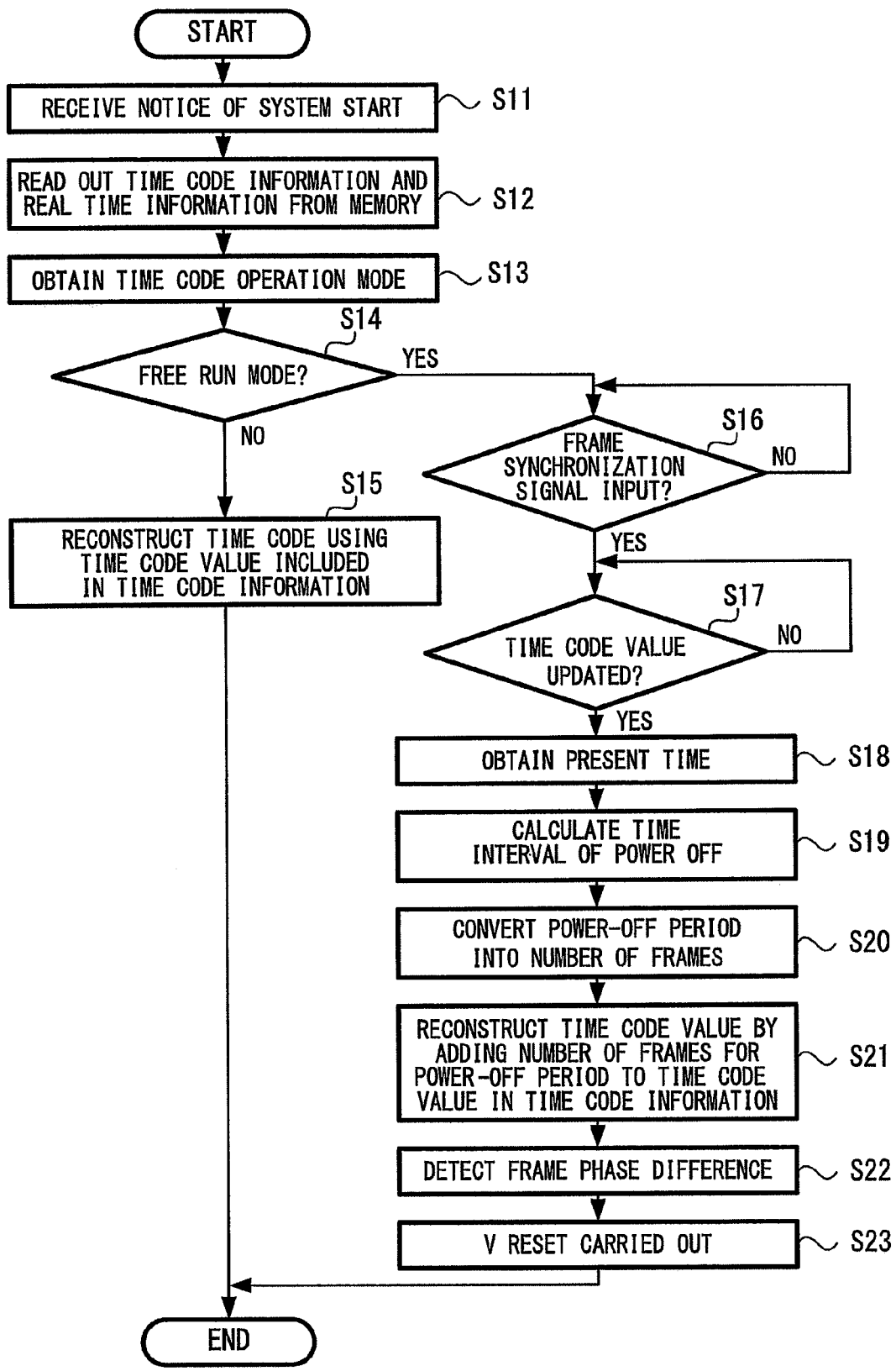
FIG. 6 is a flowchart illustrating an example of processing carried out by a time code reconstruction processing part in the recording/reproducing apparatus according to an embodiment of the present invention.

Next, an example of the time code reconstruction sequence carried out by the time code reconstruction processing part 31 will be described with reference to FIGS. 5, 6, and 7. As shown in FIG. 6, first, the time code reconstruction processing part 31 receives notice of system start issued from the power control unit 41 (see FIG. 3) (Step S11), then the time code reconstruction processing part 31 reads out the time code information and the real-time information from the memory 23 (Step S12). Next, the value set by the time code operation mode is obtained (Step S13), then it is determined whether the time code operation mode is "FREE RUN" mode (Step S14).

If the time code operation mode is not "FREE RUN" mode but "REC RUN" mode, then the time code is reconstructed using the time code value included in the time code information read out in Step S12 (Step S15).

If the time code operation mode is the "FREE RUN" mode, then it is determined whether a frame synchronization signal is input from the video sync generator 22 (Step S16). If there is no input, then the determination of Step S16 is repeated. If there is an input of a frame synchronization signal, it is determined whether the time code value has been updated in synchronization with the frame synchronization signal (Step S17). If the time code value has been not updated, then the determination of Step S17 is repeated.

If the time code value has been updated, then real-time information at the time is obtained (Step s18). Duration of the off state of the main power supply is calculated from the difference between the real-time information thus obtained and the real-time information read out of the memory 23 at Step S13 (Step S19).

The duration of power off thus obtained is converted into the number of frames (Step S20). The time code value read out of the memory 23 is then stepped by the number of frames counted to reconstruct a time code value (Step S21). The processing of converting the duration of power off into the number of frames is carried out by assuming that the output of frame synchronization signals continues during the power-off period to count the number of the frame synchronization signals output during such period. The time code value is stepped in accordance with the number of frame synchronization signals counted, thereby reconstruct the time code value similar to that obtained when the power is supplied without interruption.

The stepping processing is carried out in this step based on the time code stepping mode described in the time code information read out in Step S12. If the "non-drop frame" method is selected, then the time code is stepped for each frame. If the "drop frame" method is selected, then the time code is stepped while skipping two frames at every minute excluding the multiples of 10.

Referring again to FIG. 5, the real-time information obtained in Step S18 of FIG. 6 corresponds to "Sec=1193400900 milliSec=0" on the lower right side in FIG. 5. In Step S19 shown in FIG. 6, first, the power-off period is calculated by subtracting the value (1193400000) stored in the memory 23 in the time code storage sequence from the value (1193400900). In other words, the power-off period is equal to "1193400900−1193400000=900 (sec)".

Subsequently, the value is converted into the number of frames. The time code storage sequence allows the time code value "00:01:00:03" stored in the memory 23 to be stepped by the number of frames obtained, resulting in a time code value of "00:01:15:03". In this step, however, there is a possibility of causing a difference between the phase of the frame synchronization signal output from the video sync generator 22 before turning the power off and the phase thereof after again turning the power on.

In such a case, the phase of the reconstructed time code signal may not correspond to the phase of the frame synchronization signal output from the video sync generator 22 after turning the power on again. In order to record the time code value correctly, the difference between these phases may need to be eliminated before stepping the time code value.

As shown in FIG. 6, the difference between the phase of the frame synchronization signal and the phase of the reconstructed time code signal is detected (Step S22) and then V reset is carried out on the video sync generator 22 from the time code reconstruction processing part 31 (see FIG. 3) to eliminate the detected phase difference (Step S23).

Figure 7:
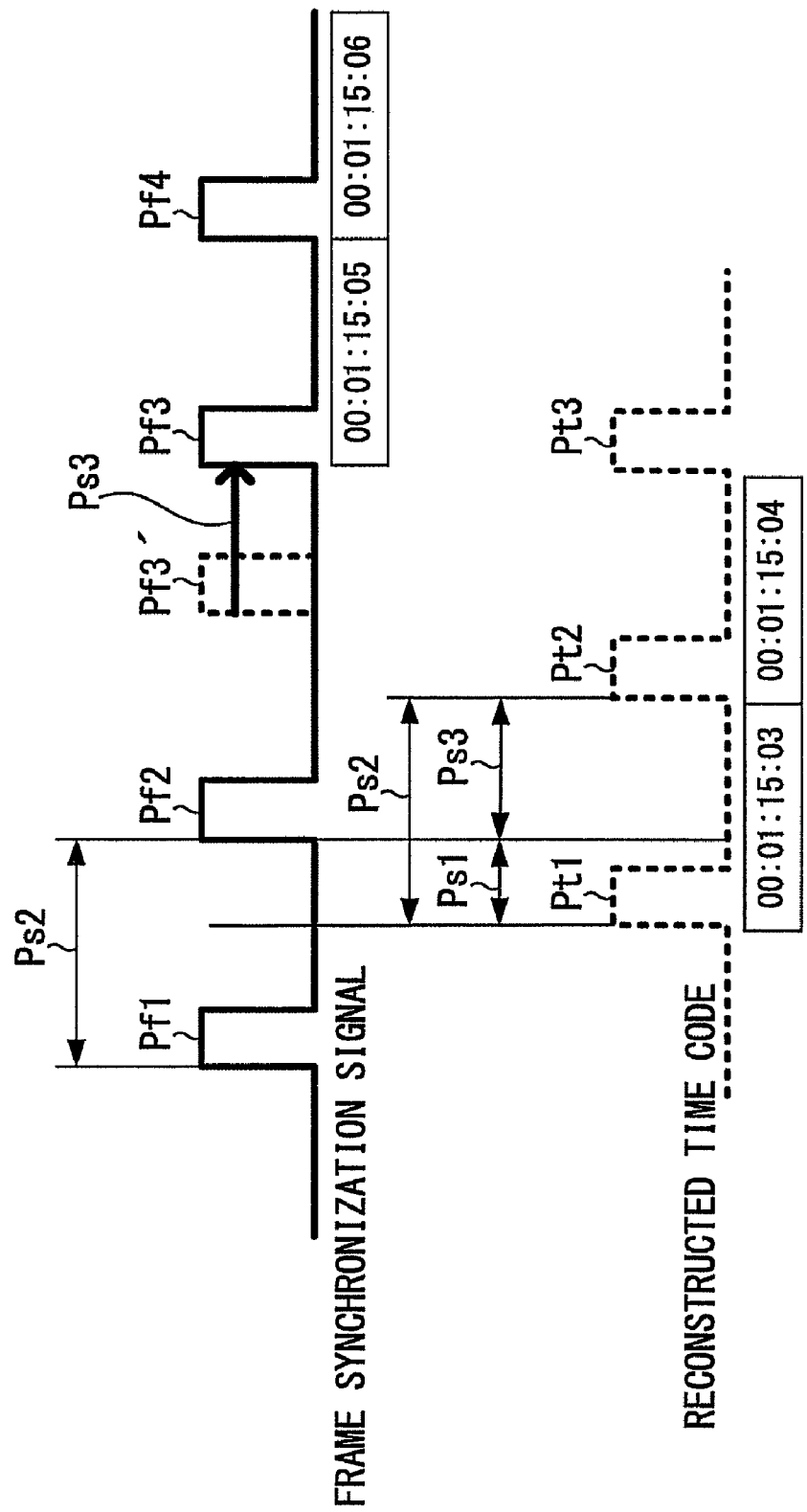
FIG. 7 is a schematic diagram illustrating processing of eliminating a phase difference between a frame synchronization signal and a time code in the recording/reproducing apparatus according to the embodiment of the present invention.

FIG. 7 illustrates the state in which the phase of the frame synchronization signal and the phase of the time code signal are out of synchronization. The upper side of FIG. 7 represents the waveform of frame synchronization signals, where frame synchronization signals (such as Pf1 and Pf2) are output at an interval of frame period Ps2. The lower side of FIG. 7 represents the waveform of the reconstructed time code signal, and the state where the time code signals such as Pt1 and Pt2 are output at the interval of frame period Ps2.

As shown in FIG. 7, the phase of the frame synchronization signal is shifted by Ps1 from the phase of the reconstructed time code signal. In order to eliminate the phase difference, the time code reconstruction part 31 carries out V reset on the video sync generator 22 and temporarily extends the output interval of frame synchronization signal.

Specifically, the time code reconstruction processing part 31 outputs a V reset signal to the video sync generator 22 upon the output of a frame synchronization signal Pf2 that is the first signal output after the reconstruction of the time code. At the time, the processing of extending the output interval of frame synchronization signal by a period Ps3 is carried out. The period Ps3 is obtained by subtracting a period Ps1 corresponding to the phase difference between the synchronization signal and the time code signal from the period Ps2 for one frame period.

Accordingly, following the frame synchronization signal Pf2, a frame synchronization signal Pf3 is output not at a time point Pf3' previously determined with an original frame cycle but at a time point delayed from Pf3' by the period Ps3. In other words, the frame synchronization signal Pf3 can be output at the same timing as that of the output of reconstructed time code signal Pt3. The interval of the output of a frame synchronization signal may be changed once after the reconstruction of the time code and then repeated at an original interval to synchronize the phase of the frame synchronization signal with that of the reconstructed time code.

In addition, the time code value is further stepped for additional one frame when the phase of the frame synchronization signal is synchronized with that of the time code signal. Thus, the consistency between the time code values before and after the processing of phase can be achieved.

According to the embodiment described above, in the case where the time code operation mode is set to "FREE RUN" mode, both the time code information and the real-time information are stored in the memory 23 using as a trigger the operation of turning the main power supply off. Subsequently, when the main power supply is turned on again, the time code is reconstructed on the basis of the real-time information at the time and the time code information and real-time information read out of the memory 23. Therefore, a time code in real time can be obtained without providing a dedicated time code generator having a battery.

In this case, since a time code value can be stored and reconstructed using an existing units such as the RTC 21, the power-supply unit 40 for the RTC 21, and the memory 23. Thus, additional parts may not be required. Accordingly, manufacturing costs can be reduced.

Further, in the case where the time code operation mode is set to the "FREE RUN" mode, after receiving the power-off operation, a time code value and real-time information are stored in the memory 23 at the timing of updating the time code value. Thus, the real-time information at the time of the update is read out when reconstructing a time code value. Therefore, when the stepping of time code values is carried out on the basis of the period of the power off, the timing of updating a time code value before the reconstruction thereof is in sync with the timing of updating a time code value after the reconstruction thereof.

Furthermore, when the time code is reconstructed under the operation of the "FREE RUN" mode, even if a difference is caused between the phase of the reconstructed time code and the phase of the frame synchronization signal, such a phase difference can be eliminated by carrying out V reset on the video sync generator 22 by the time code reconstruction processing part 31. In other words, the frame synchronization signal is output in the same phase as that of the time code signal at the power off state. The stepping of the time code value in synchronization with the frame synchronization signal allows the same time code value as that output in the state, where the electric power is continuously supplied as is the related art, to be generated.

Furthermore, information about the time code stepping method, such as "drop frame" or "non-drop frame" is also stored as time code information in the memory 23 when the power off is input by an input operation. Thus, the stepping can be carried out according to such modes when the time code is reconstructed.

Furthermore, in the above embodiment, the recording/reproducing apparatus having an imaging unit has been described. Alternatively, the above embodiment may be applied to a recording/reproducing apparatus without an imaging unit.

It should be understood by those skilled in the art that various modifications, combinations, and sub-combinations and alterations may occur depending on design requirements and other factors insofar as they are within the scope of the appended claims or the equivalents thereof.

What is claimed is:

1. A recording/reproducing apparatus comprising:
a synchronization signal generating part configured to output a frame synchronization signal defining a period of a video frame;
a timer part configured to measure time including during a period in which a main power supply is being turned off and to output measured time information;
a time code production part configured to generate a video time code on the basis of the frame synchronization signal;
a time code storage processing part configured to store a video time code value at the time the main power supply is being turned off and the time information output from the timer part at the time the main power supply is turned off; and
a time code reconstruction processing part configured to reconstruct the video time code, when the main power supply is turned on, by stepping the video time code value stored by the time code storage processing part by an amount corresponding to the time information stored by the time code storage processing part and the time information output at the time of turning on the main power supply.

2. A recording/reproducing apparatus comprising:
a synchronization signal generating part configured to output a frame synchronization signal defining a period of a video frame;
a timer part configured to measure a time during a period in which a main power supply is being turned off;
a time code production part configured to generate a time code on the basis of the frame synchronization signal;
a time code storage processing part configured to store a time code value and time information output from the timer part, when the main power supply is turned off; and
a time code reconstruction processing part configured to reconstruct the time code, when the main power supply is turned on, by stepping the time code value stored by the time code storage processing part by an amount corresponding to a period where electric supply from the main power supply is being stopped on the basis of the time code value and the time information stored by the time code storage processing part and time information at the time of turning on the main power supply, and wherein the time code reconstruction processing part steps the time code in accordance with a mode selected from a "FREE RUN" mode of stepping the time code in synchronization with time information output from the timer part and a "SYNC" mode of stepping the time code only during a period where the video frame is input; and
wherein the time code reconstruction processing part carries out processing of reconstructing the time code, when the time code is stepped in accordance with the "FREE RUN" mode.

3. The recording/reproducing apparatus according to claim 2, wherein the time code reconstruction processing part carries out processing of synchronizing a phase of the frame synchronization signal with a phase of the reconstructed time code, when the phase of the reconstructed time code is out of synchronization with the phase of the frame synchronization signal output from the synchronization signal generating part.

4. The recording/reproducing apparatus according to claim 3, wherein the time code reconstruction processing part eliminates a difference between the phase of the frame synchronization signal and the phase of the reconstructed time code by temporally extending a period of outputting the frame synchronization signal with a reset signal output to the synchronization signal generating part after reconstructing the time code.

5. The recording/reproducing apparatus according to claim 4, wherein the time code storage processing part stands by until a frame synchronization signal is input from the synchronization signal generating part when the main power supply is turned off, and carries out processing of storing both the time code value and the time information when the time code is stepped in synchronization with the frame synchronization signal.

6. The recording/reproducing apparatus according to claim 3, wherein the time code reconstruction processing part calculates the number of the frame synchronization signals which may have been output during a period in which main power supply is being turned off on the basis of a difference between time information at a time of restarting the supply from the main power supply and the time information stored by the time code storage processing part, and reconstructs the time code value by stepping the time code by the calculated number of the output frame synchronization signals.

7. The recording/reproducing apparatus according to claim 2, wherein when the time code is stepped in the "SYNC" mode, the time code reconstruction processing part reads out and steps the time code value stored by the time code storage processing part at the time of turning on the main power supply and restarting the supply of electric power.

8. The recording/reproducing apparatus according to claim 2, further comprising:
 a power control unit configured to output a signal notifying the time code storage processing part of system stop when the main power supply is turned off and the supply of electric power is stopped, and notify the time code reconstruction processing part of system start when the main power supply is turned on,
 wherein the time code storage processing part carries out processing of storing the time code value and the time information when a signal for notification of the system stop is output from the power control unit; and
 wherein the time code reconstruction processing part carries out processing of reconstructing the time code when a signal for notification of the system start is output from the power control unit.

9. A method of reconstructing a time code, carried out in a recording/reproducing apparatus having a synchronization signal generating part configured to output a frame synchronization signal that defines a period of a video frame and a timer part configured to measure time including during a period in which a main power supply is being turned off, comprising the steps of:
 generating a video time code on the basis of the frame synchronization signal;
 storing a value of the video time code at the time the main power supply is being turned off and the time information output from the timer part at the time the main power supply is turned off; and
 reconstructing the video time code, when the main power supply is turned on, by stepping the stored video time code value by an amount corresponding to the stored time information and the time information measured at the time of turning on the main power supply.

* * * * *